United States Patent Office 2,831,664
Patented Apr. 22, 1958

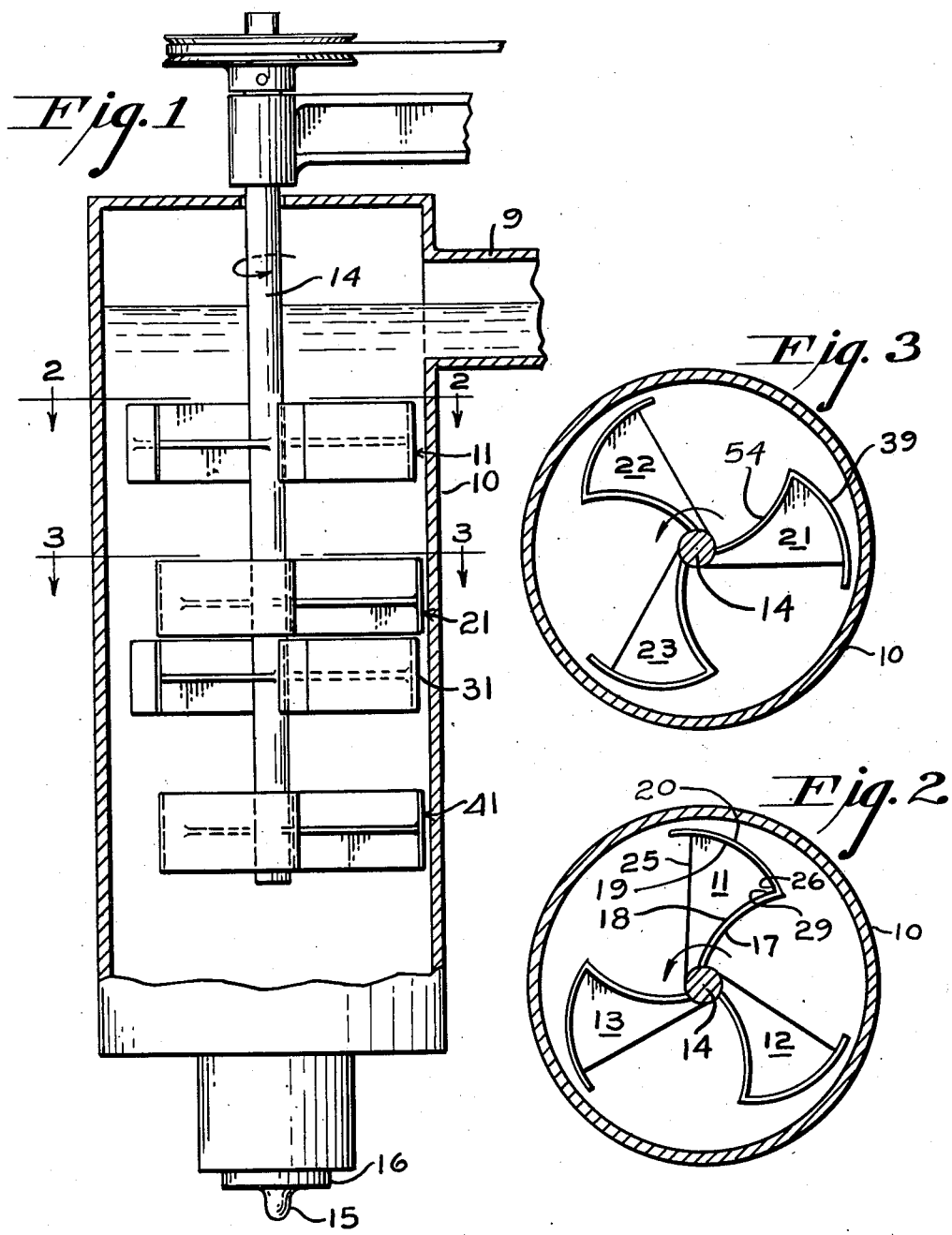

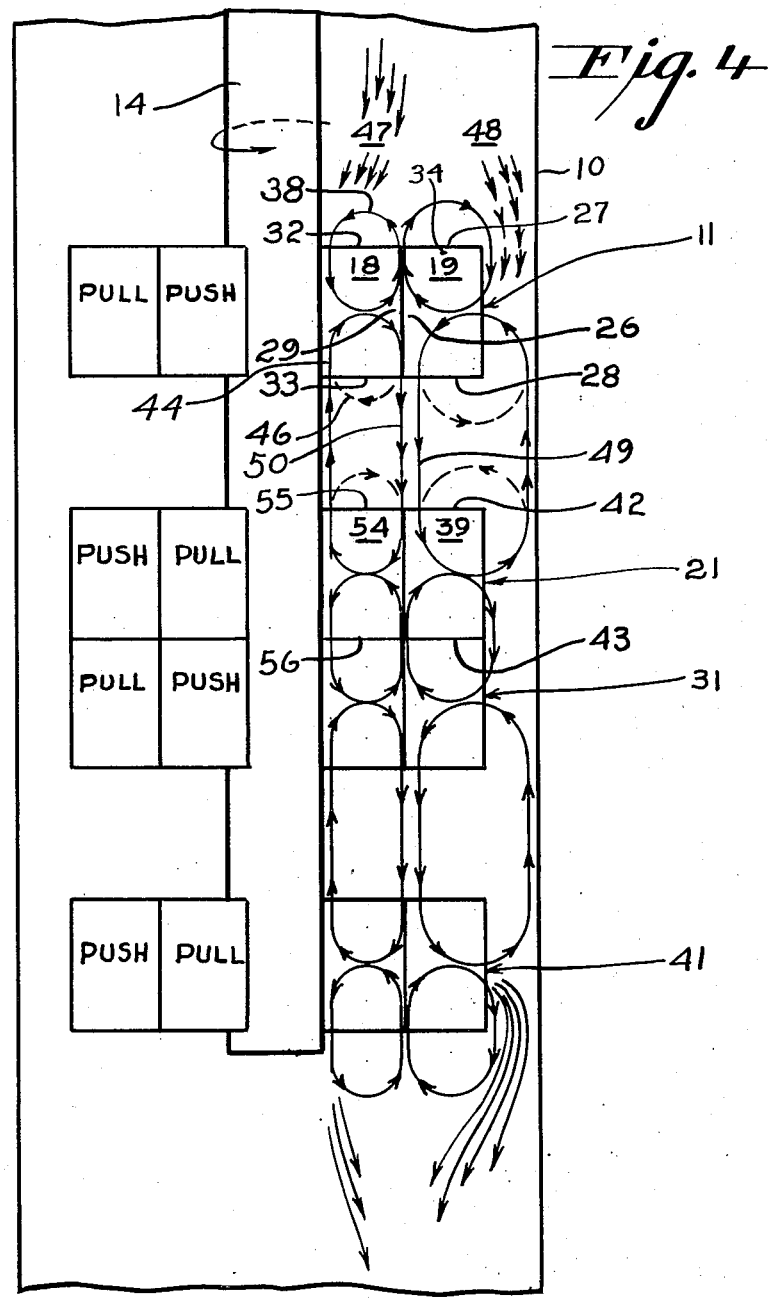

2,831,664

GLASS STIRRING

Paul F. Spremulli, Corning, N. Y., assignor to Corning Glass Works, Corning, N. Y., a corporation of New York Application October 30, 1953, Serial No. 389,255

2 Claims. (Cl. 259—107)

The present invention relates to methods and means for stirring and/or feeding molten glass while in transit from a supply body thereof to a working pool or to a forming apparatus. The invention may be considered as an improvement on the method and/or means of stirring glass being passed through housing passages such as shown for example in Patent No. 2,569,459 to Charles F. De Voe and in my Patents Nos. 2,570,078, and 2570,079; the stirring apparatus per se of the present invention being interchangeable with those disclosed in the aforesaid patents.

The prime object of the present invention is the provision of a stirrer of simple form that for a given rotational speed and number of blades out-performs those previously known in the elimination of inhomogeneities in molten glass, and particularly in systems in which glass from a supply body is progressively homogenized just in advance of its delivery to a pool for working or just before its delivery to forming apparatus.

According to the invention each stirrer blade of the present stirrer comprises at least two intersecting arcuate sections, one section having an edge attached to the stirrer shaft, which is adapted to be arranged coaxially within a surrounding passage of circular cross section. In a preferred form of embodiment, the stirrer blade has two sections projecting laterally from the shaft in edge-to-edge relation and so arranged that, for the direction of rotation of the shaft in which the concave surface of the outer section leads, such section while imparting a circular movement to engaged glass functions to pull glass from the region of the passage wall inwardly toward the passage axis and to eject such glass upwardly and downwardly over the edges of such section along its line of juncture with the adjoining inner section. The convex surface of such adjoining inner section, however, while similarly imparting a circular movement to the engaged glass, pushes glass from the axial region of the passage toward the juncture of such sections, thereby pulling in glass from above and below the section edges in the axial region of the passage and pushing it toward the line of juncture of such sections so that glass is ejected upwardly and downwardly over the edges thereof adjacent such line of juncture and to some extent intermingles with that being ejected from the upper and lower edges of the outer section. The blade sections exchange functions on rotation of the shaft in the reverse direction, the convex surface of the outer section then functioning to eject glass into the passage wall region while pulling glass over the top and bottom edges thereof adjacent the inner section, whereas the concave surface of the inner section takes in glass over its edges adjoining the outer section and ejects glass over its edges in the axial region of the passage.

In the drawings

Fig. 1 is an elevational view, partly in section, of a form of apparatus adapted to receive glass issuing from a suitable supply body and containing a stirring assembly embodying the invention and adapted to stir the glass therein to a high state of homogeneity, preceding its issuance therefrom.

Fig. 2 is a sectional view taken on line 2—2 of Fig. 1.

Fig. 3 is a sectional view taken on line 3—3 of Fig. 1.

Fig. 4 is an elevation similar to Fig. 1 schematically illustrating the stirring assembly confined within a cylinder and showing the general nature of the glass flow paths created during counter-clockwise rotation of the stirrer therein.

In detail Fig. 1 shows a glass feed tube 9 extending between a supply body of molten glass (not shown) and a cylinder 10 surrounding a stirring assembly embodying the invention. The homogenized glass 15 issues from cylinder 10 via a delivery tube 16.

The stirring assembly per se comprises a rotatable shaft 14 having arranged thereon two or more blades such as 11 each having an inner section having a concave surface such as 17 (Fig. 2) and a convex surface such as 18 and having an adjoining outer section having a concave surface such as 19 and a convex surface such as 20. When the blades, as illustrated, are made of sheet material it is preferable to provide each blade with a transverse strengthening strut, web, or disc such as 25. Such disc has side and end edges respectively fixed to the adjoining surfaces 18 and 19, with its other end fitted and joined to shaft 14. The blades may, however, be made of refractory material under which circumstances the surfaces such as 17 and 18 or 19 and 20 may be substantially spaced from one another and of sufficient strength to obviate the need for a strengthening strut. Additionally in such a structure opposing surfaces such as 17 and 18 or 19 and 20 may be of different curvature.

In the arrangement shown, blade 11 is one of a set of three identical blades 11, 12 and 13 radiating in uniformly spaced relation from the same level of shaft 14. Arranged below blades 11—13 a distance approximately equal to the height of such blades are blades 21, 22, and 23 comprising a second set thereof. Blades 21—23 are identical to blades 11—13 but, as can be seen from Fig. 3, are inverted and are preferably positioned clockwise with respect to blades 11—13 approximately 60° rather than being in vertical register with such blades. Arranged on shaft 14 immediately below blades 21—23 is a third set in which blade 31 is included. Such third set is identical to that first described and in vertical register therewith. At a still lower level on shaft 14 is a fourth set of blades including blade 41, identical to the set including blades 21—23 and in vertical register therewith.

Referring to Figs. 2 and 4, and for the moment disregarding the presence of the blade sets including blades 21, 31 and 41, it will be observed that upon the counter-clockwise rotation of shaft 14 the concave surface 19 of the outer section of blade 11 pulls glass inwardly from the region of the wall of cylinder 10 and forces such engaged glass toward the inner edge 26 thereof and thence upwardly and downwardly of its edges 27 and 28 from which areas it moves to replace some of the glass displaced from the region of the cylinder wall. At the same time the convex surface 18 of the inner section of the blade pushes glass from the shaft region toward the outer edge 29 of such surface, causing the glass to move upwardly and downwardly over its edges 32 and 33 from which areas it moves to replace some of the glass displaced from the shaft region by such pusher section. Thus it will be seen that this two-section blade, while imparting a rotary movement about its shaft axis to glass engaged by it, at the same time creates circulatory movements about generally horizontal circular axes such as 34 traveling about the shaft axis in four toroidal paths in the vicinity of the upper and lower edges of the respective stirrer blade sections as indicated by the arrowed solid lines such as 38 and 44 and by the associated interrupted lines 46. Of course, concurrently with the foregoing rotary and circulatory movements there is an overall movement of glass through the cylinder, the incoming glass entering the stirrer path via the two annular routes indicated by arrows 47 and 48 respectively so that, as the glass entering such path is therein rotated about the shaft, it circulates about the stirrer blade sections as described. The glass leaves the stirrer blade in a direction toward the lower end of the cylinder via a single path bridging the line of juncture of sections 18 and 19 and indicated by the arrowed lines 49 and 50. Collectively the so-created circulatory and forward movements imparted to the glass and aided by the respective blade struts passing transversely through the forward moving glass, effectively attenuate and stir the glass to a high degree of homogeneity before its issuance from the cylinder. The stirring action as above described may of course be greatly augmented for a given speed of shaft rotation by the provision of a greater plurality of blades at the same level alone or in conjunction with similar blades at other levels in the cylinder.

As will be appreciated, the number of blades located at a particular level on the shaft, the number of blade levels along the shaft length, their space relationship and/or their angular positions with respect to one another along the shaft length may be varied to attain the desired degree of glass homogeneity in feeding at different rates, at different glass viscosities and through stirrer passages of widely varying dimensional characteristics. Although a 1:1 volume ratio of glass displacement by the inner and outer sections is usually found satisfactory, the line of juncture of the inner and outer sections of a blade may be selected to give any desired volume ratio. For example tests in a particular installation may show that inferior glass is issuing from a particular cross-sectional area of the cylinder. In such case a stirrer having blades whose sections displace a greater percentage of the glass in such area by accelerating the movement therein may be employed to bring about a balance and an improvement in the quality of the glass throughout the transverse cross-section of the stream issuing from the cylinder. Such stirrer may embody one in which the line of juncture of the inner and outer sections has been shifted or may embody one in which the radius of curvature has been modified.

As will be understood the curvature of either blade section may be of uniform or non-uniform radius and the same or different. Advantageously, the outer section is in part concentric with the cylinder wall. As indicated in the drawings, the curvatures of the two sections are conveniently about axes parallel to the shaft axis, and the curvature of the leading face of one section is reversed with respect to the curvature of the leading face of the other section. Put another way, the curvatures of the two sections are preferably in the same general direction, as determined by doubling back the outer section onto the inner section, with the outer section further removed from the shaft throughout substantially its entire curvature than the inner section.

For conditions wherein the highest standard of glass quality is not essential, a multi-blade stirrer with the blades all at one level may be used with an existing unusually shallow housing; or two levels of blades as shown in Fig. 1 of Patent No. 2,570,079 may prove preferable if the housing height permits. On the other hand blade combinations and orientations of the orders shown in Figs. 1 and 4 of the instant application and similar to that in Fig. 1 of Patent No. 2,569,459 are most suitable to attain the quality requirement of cord-free optical glass, the instant blade construction being more efficient than those shown in such patent in counteracting movement of glass along both the cylinder wall and the shaft in the direction of throughput because of the greater shearing and improved mixing obtained.

While the particular housing shown has a circular passage of uniform transverse cross-section, if desired a conically shaped passage may be employed. In any instance, however, the clearance space between the blade and the passage wall is preferably made uniform throughout the blade height in the region of its closest approach thereto.

If the direction of rotation of shaft 14 is reversed the flow pattern about blade 11 will be as shown by blade 21 which as hereinbefore explained and as evidenced by Fig. 3 is like blade 11 except that it has been inverted before placement on shaft 14.

Disregarding for a moment the presence of other blade assemblies on shaft 14 during its counter-clockwise rotation, the flow pattern about blade 21 is the same as described with respect to blade 11 except that the direction of movement of the glass is reversed as generally indicated by the associated arrowed solid and interrupted lines. To explain more fully, the convex outer surface 39 of the outer section of blade 21 forces glass outwardly toward the cylinder wall while replacement glass enters the blade path via the upper and lower blade edges 42 and 43 near their line of juncture with the inner section of the blade. In a similar fashion the concave surface 54 of such inner section forces glass toward the axial region of the cylinder and over the upper and lower edges 55 and 56 of the blade, while replacement glass enters the path of the blade over such edges in the region of juncture of the two blade sections. With only the blade assemblies embodying blades 11 and 22 present, the flow paths are modified as indicated by the solid arrowed lines between the respective blades. Obviously if the spacing between blade sets is too great each set independently creates its own isolated flow paths thereabout.

Blade 31 of the set immediately below blade 21, arranged upright with respect to blade 11 rather than inverted, does not affect the flow path of arrowed solid lines about blade 21 except that the flow about the lower edges of such blade is accelerated by the aid given by blade 31 which, in the absence of blade 21, creates the same flow patterns as blade 11. Obviously in the absence of any blade below blade 31 the flow patterns projecting from the lower edges of this blade are identical to those described with reference to blade 11 above in the absence of any blade under it. The addition, however, of a fourth set of blades including blades such as 41, inverted with respect to blades 11 and 31 as in the case of blade 21, with a spacing between blades 31 and 41 corresponding to that between blades 11 and 21, brings about a duplication of the flow patterns between blades 11 and 21.

The above full complement of blades has been found ideally suited to the mixing of glass to the high state of homogeneity required for optical purposes. For example, employing the foregoing full complement of blades within a four-inch diameter cylinder such as 10, with a three-eighths inch wall clearance to stir glass at a kinematic viscosity of 360 cm.$^2$/sec. fed downwardly through such cylinder at a feeding rate of up to two hundred pounds per hour and with the shaft rotating at only fifty R. P. M., no cord was visible.

An optical plant stirrer and feeder installation similar to that illustrated in Fig. 1, but employing two pairs of adjoining blade sets such as 21 and 31 spaced one inch apart on the stirrer shaft and rotated in a clockwise direction at only 38 R. P. M. has proven highly successful. In such installation the glass entered the passage at a temperature of approximately 1250° C. at a viscosity of 600 poises, 200 pounds of high optical quality glass being delivered per hour.

Although only one specific form of stirrer blade having but two sections each adapted to move a substantially equal amount of glass has been illustrated, as hereinbefore pointed out, it is obviously within the concept of the invention to arrange for one section to move more glass than another and/or to provide a third section to move additional glass either toward the shaft or toward the cylinder wall as the needs dictate. Obviously it is also within the concept of the invention to employ an assembly wherein the curvature of the blades of different sets and/or their volume of glass displacement differ.

What is claimed is:

1. In a stirring device, a vertically disposed tubular cylinder, stirring means within said cylinder comprising a shaft projected along the cylinder axis, a stirrer blade consisting of a sheet of refractory material extending laterally from one side of said shaft to a point near the cylinder wall, said blade being vertically divided into inner and outer portions each having a concave surface and an oppositely disposed convex surface directly exposed to material within said cylinder, the curvatures of such portions being about different centers extending parallel to the cylinder axis, said blade portions being so positioned with respect to one another in said cylinder that on rotation of the shaft in one direction the leading surface of the inner portion of the blade is available to force encountered material about a circular path biased outwardly toward the cylinder wall, while the leading surface of the outer portion is available to pull material inward from the cylinder wall while urging it to move in the direction of rotation.

2. A stirring device such as defined by claim 1 wherein on rotation of the shaft in the reverse direction the leading surface of the inner portion of the blade is available to pull material inward from the cylinder wall while urging it to move in the direction of rotation and the leading surface of the outer portion of the blade is available to force encountered material about a circular path biased outwardly toward the cylinder wall.

References Cited in the file of this patent
UNITED STATES PATENTS

| | | |
|---|---|---|
| 216,053 | Mooney | June 3, 1879 |
| 1,768,956 | Johnson | July 1, 1930 |
| 1,949,696 | Schoneborn | Mar. 6, 1934 |
| 2,459,636 | Fenney | Jan. 18, 1949 |
| 2,569,459 | De Voe | Oct. 2, 1951 |
| 2,570,078 | Spremulli | Oct. 2, 1951 |